United States Patent
Hsu et al.

(10) Patent No.: US 8,046,781 B2
(45) Date of Patent: Oct. 25, 2011

(54) OPTICAL DISC DRIVE

(75) Inventors: Chi-Chao Hsu, Taipei (TW);
Chih-Cheng Lin, Taipei (TW)

(73) Assignee: Pegatron Corporation, Taipei (TW)

( * ) Notice: Subject to any disclaimer, the term of this patent is extended or adjusted under 35 U.S.C. 154(b) by 509 days.

(21) Appl. No.: 12/211,049

(22) Filed: Sep. 15, 2008

(65) Prior Publication Data
US 2009/0119689 A1    May 7, 2009

(30) Foreign Application Priority Data

Nov. 5, 2007    (TW) .................................. 96141669 A

(51) Int. Cl.
*G11B 17/03* (2006.01)
(52) U.S. Cl. .......................................................... 720/613
(58) Field of Classification Search ...................... None
See application file for complete search history.

(56) References Cited

U.S. PATENT DOCUMENTS

| | | | |
|---|---|---|---|
| 6,700,850 B2 | 3/2004 | Takahashi et al. | |
| 7,434,236 B2 * | 10/2008 | Wu et al. ....................... | 720/603 |
| 2004/0047266 A1 * | 3/2004 | Chuang et al. ................ | 369/75.1 |
| 2004/0081056 A1 * | 4/2004 | Huang et al. .................. | 369/75.2 |
| 2005/0235301 A1 * | 10/2005 | Chuang ......................... | 720/647 |
| 2005/0289573 A1 * | 12/2005 | Guo et al. ...................... | 720/648 |
| 2006/0143623 A1 * | 6/2006 | Shimizu et al. ............... | 720/601 |
| 2006/0288355 A1 * | 12/2006 | Wu et al. ........................ | 720/613 |
| 2007/0061823 A1 * | 3/2007 | Wang et al. .................... | 720/647 |

FOREIGN PATENT DOCUMENTS

| | | |
|---|---|---|
| TW | 200410209 | 6/2004 |
| TW | 200713234 | 4/2007 |

OTHER PUBLICATIONS

"Office Action of Taiwan counterpart application", issued on Jul. 12, 2011, p. 1-p. 5, in which the listed references were cited.

* cited by examiner

*Primary Examiner* — Mark Blouin
(74) *Attorney, Agent, or Firm* — J.C. Patents

(57) ABSTRACT

An optical disc drive suitable for reading a data in an optical disc is provided. The optical disc drive includes a housing, a tray suitable for carrying the optical disc, and a panel. The housing has a first opening, and the panel is disposed at the first opening. The tray is disposed in the housing. The tray has a blocking plate. The blocking plate is disposed on a front edge of the tray, and multiple protrusions are disposed on an upper edge of the blocking plate. Furthermore, the panel has a second opening, and the second opening has multiple notches corresponding to the protrusions. The tray is suitable for exiting out of the housing through the second opening, and the protrusions are suitable for passing through the notches.

8 Claims, 5 Drawing Sheets

OPTICAL DISC DRIVE

CROSS-REFERENCE TO RELATED APPLICATION

This application claims the priority benefit of Taiwan application serial no. 96141669, filed on Nov. 5, 2007. The entirety of the above-mentioned patent application is hereby incorporated by reference herein and made a part of specification.

BACKGROUND OF THE INVENTION

1. Field of the Invention

The present invention generally relates to an optical disc drive, in particular, to an optical disc drive capable of preventing fragments generated by the cracking of the optical disc from shooting out.

2. Description of Related Art

Owing to the advantages of low price, portability, large storage capacity, easy-to-shelf, long saving period, and durability of data, the optical discs currently has gradually replaced the conventional magnetic storage media and become the indispensable optical storage media for modern people. Due to the popularity of the optical disc, the optical disc drive for reading data in the optical discs have become an electronic product commonly seen in daily life.

However, along with the increasing of the reading speed of the optical disc drive, the qualities of the optical discs currently available in the market are greatly diverse, so when the optical disc drive spins at high speed, if the optical disc has a poor quality, the optical disc may be easily cracked. The fragments of the optical disc may shoot out through the clearance between the tray carrying the optical disc and the optical disc drive to hurt the user.

SUMMARY OF THE INVENTION

The present invention is directed to an optical disc drive, which can effectively prevent the fragments of the optical disc shooting out of the optical disc drive.

The present invention provides an optical disc drive suitable for reading a data in an optical disc. The optical disc drive includes a housing, a tray suitable for carrying the optical disc, and a panel. The housing has a first opening, and the panel is disposed at the first opening. The tray is disposed in the housing. The tray has a first blocking plate. The first blocking plate is disposed on a front edge of the tray, and multiple protrusions are disposed on an upper edge of the first blocking plate. Furthermore, the panel has a second opening and multiple notches corresponding to the protrusions. The tray is suitable for exiting out of the housing along a path through the second opening, and the protrusions are suitable for passing through the corresponding notches.

In an embodiment of the present invention, when the tray is located in the housing, the first blocking plate is located on an inner or outer side of the second opening.

In an embodiment of the present invention, the tray further includes a second blocking plate disposed on a front edge of the tray. When the tray is located in the housing, and the second blocking plate is located on an outer side of the second opening. The second blocking plate is suitable for shielding a clearance between the notches and the first blocking plate.

In an embodiment of the present invention, the tray further includes multiple blocking ribs which are located on an inner side of the first blocking plate.

In an embodiment of the present invention, the optical disc drive further includes a lid that is disposed at a front edge of the tray, and suitable for covering the second opening.

In an embodiment of the present invention, the first blocking plate and the panel are interdigitated.

In an embodiment of the present invention, the optical disc drive further includes a pickup module disposed in the housing, and suitable for reading the data in the optical disc.

In an embodiment of the present invention, the pickup module includes a spin motor and an optical pickup head.

In an embodiment of the present invention, the panel has multiple hooks through which the panel is fixed onto the housing.

In the present invention, the first blocking plate having multiple protrusions on the upper edge thereof is disposed on the front edge of the tray, so as to effectively prevent the fragments of the optical disc shooting out of the optical disc drive to hurt the user.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
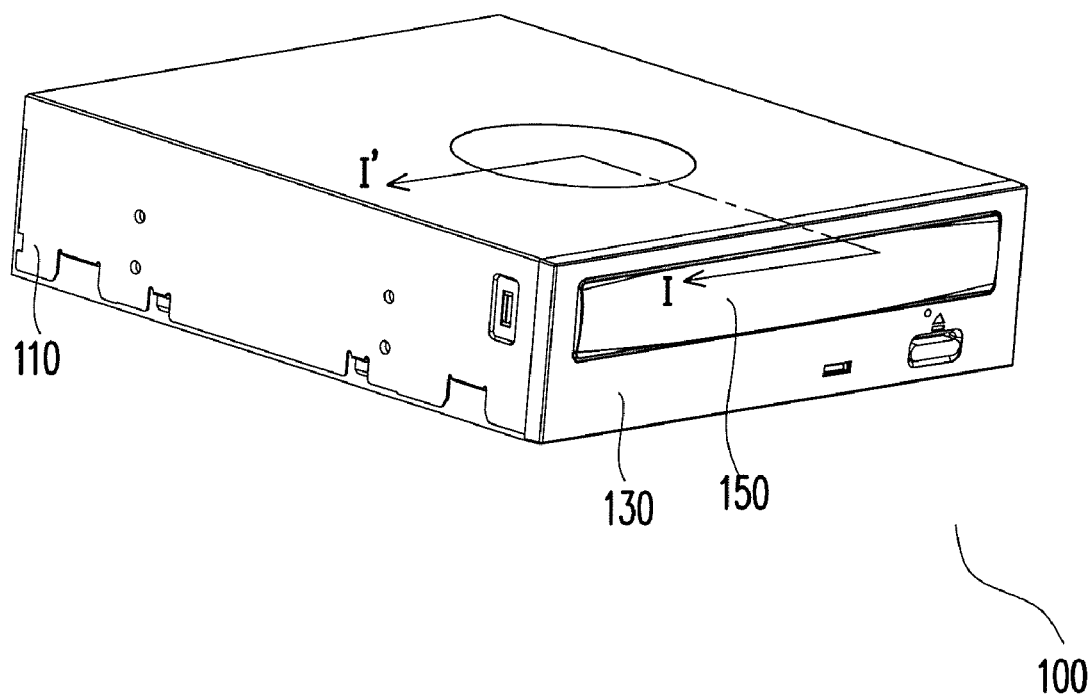
FIG. 1A is a schematic view illustrating an optical disc drive according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
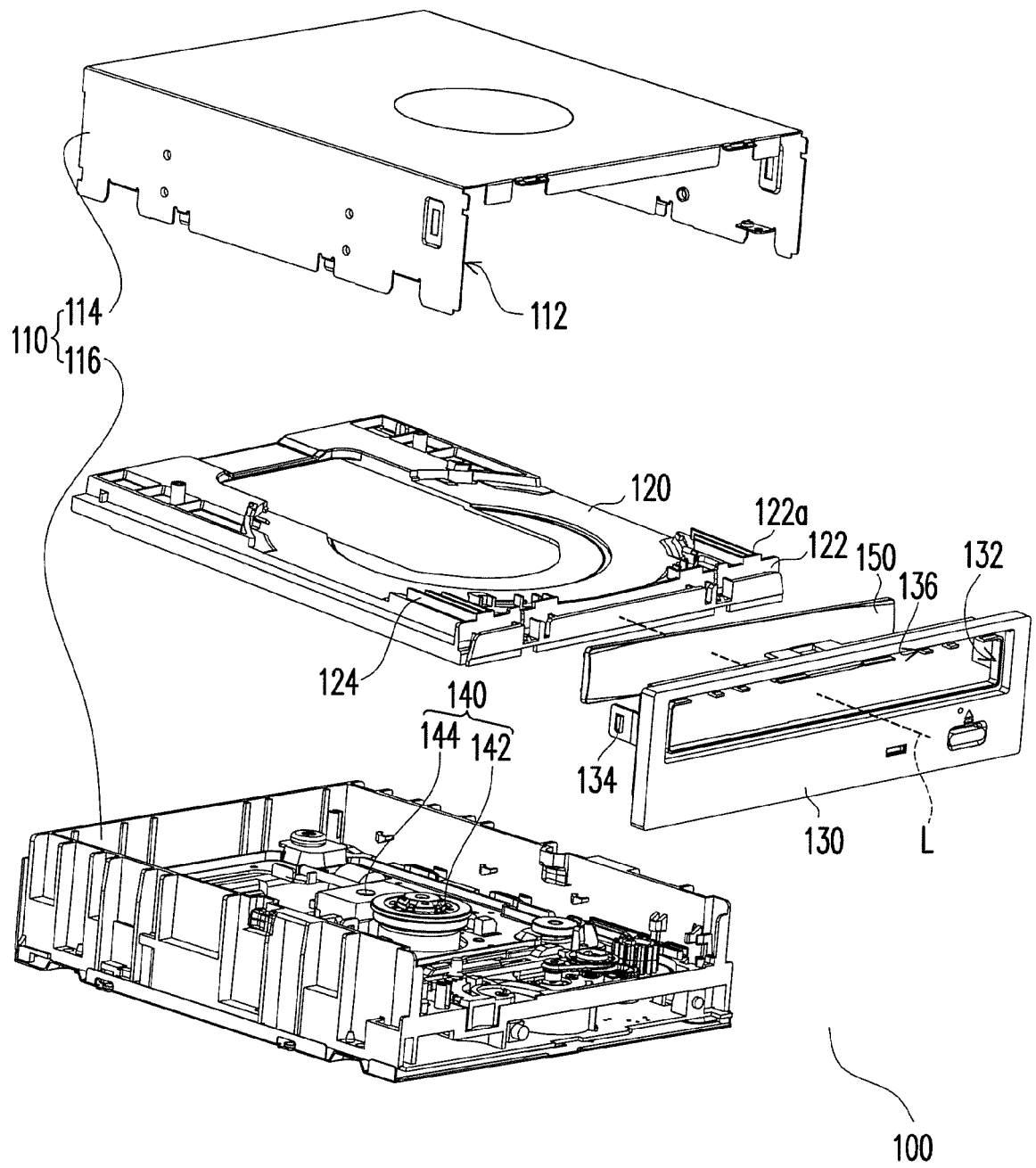
FIG. 1B is an exploded view illustrating the optical disc drive of FIG. 1A.

FIG. 1A is a schematic view illustrating an optical disc drive according to an embodiment of the present invention. FIG. 1B is an exploded view illustrating the optical disc drive of FIG. 1A. Referring to FIGS. 1A and 1B, the optical disc drive 100 of this embodiment is suitable for reading a data stored in an optical disc (not shown). The optical disc drive 100 of this embodiment includes a housing 110, a tray 120, and a panel 130. In this embodiment, the housing 110 has a first opening 112, and the panel 130 is disposed at the first opening 112.

Furthermore, the panel 130 of this embodiment has a second opening 132, and the optical disc is suitable for entering into the housing 110 through the second opening 132. In addition, the optical disc drive 100 in this embodiment further includes a pickup module 140 disposed in housing 110 and suitable for reading data. The pickup module 140 is suitable for reading the data stored in the optical disc. Definitely, in other embodiments, the pickup module 140 may also burn data on the optical disc.

Accordingly, the housing 110 in this embodiment includes an upper housing 114 and a lower housing 116. The panel 130 is, for example, fixed on the housing 110 through multiple hooks 134. The tray 120 is disposed in the housing 110, and is suitable for carrying the optical disc.

The tray 120 for carrying the optical disc exits out of the housing 110 along a path L through the second opening 132, for the user to place the optical disc. In this embodiment, the tray 120 has a lid 150 at its front edge. When the tray 120 is located in housing 110, the lid 150 is suitable for covering the second opening 132. When the tray 120 exits out of the housing 110 along the path L, the lid 150 moves along the path L with the tray 120, and will not cover the second opening 132.

The pickup module 140 includes a spin motor 142 and an optical pickup head 144. After the optical disc enters into the housing 110 along with the tray 120, the spin motor 142 drives the optical disc to spin, and thus the optical pickup head 144 may read the data stored in the optical disc.

In particular, the tray 120 of this embodiment has a first blocking plate 122 disposed on the front edge of the tray 120. When the tray 120 is located in the housing 110, the first blocking plate 122 is, for example, located on the inner side of the second opening 132. It should be noted that when the optical disc located on the tray 120 suddenly cracks, the first blocking plate 122 of this embodiment may effectively prevent the fragments of the optical disc shooting out of the optical disc drive 100. Hereinafter, the way that the first blocking plate 122 prevents the fragments of the optical disc shooting out of the optical disc drive 100 is illustrated in more detail in accompanying with the drawings.

Figure 2A:
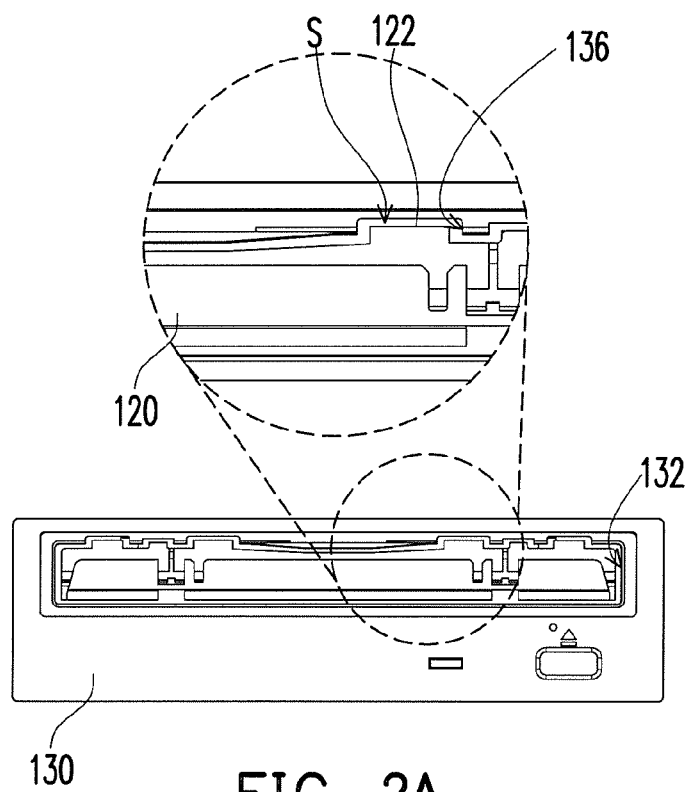
FIG. 2A is a front view illustrating the optical disc drive of FIG. 1A after a lid is removed.
Figure 2B:
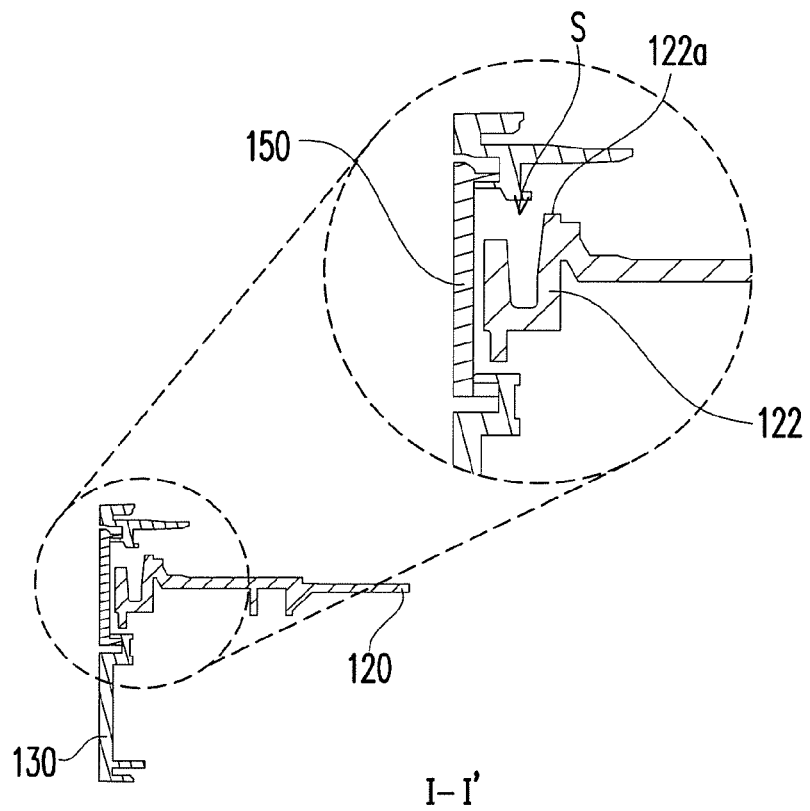
FIG. 2B is a cross-sectional view illustrating partial components of the optical disc drive of FIG. 1A taken along line I-I'.

FIG. 2A is a front view illustrating the optical disc drive of FIG. 1A after a lid is removed. FIG. 2B is a cross-sectional view illustrating partial components of the optical disc drive of FIG. 1A taken along line I-I'. Referring to FIGS. 1B, 2A, and 2B, in this embodiment, multiple protrusions 122a are disposed on the upper edge of the first blocking plate 122. The protrusions 122a are, for example, formed on the upper edge of the first blocking plate 122 in a grid arrangement manner. Furthermore, the second opening 132 of this embodiment has multiple notches 136 corresponding to the protrusions 122a. In this manner, when the tray 120 intends to exit out of the housing 110 along the path L through the second opening 132, since the multiple notches 136 disposed on the panel 130 are suitable for the multiple protrusions 122a on the upper edge of the first blocking plate 122 to pass through, the tray 120 having the first blocking plate 122 may successfully pass through the panel 130 via the second opening 132 and the notches 136, thereby exiting out of the housing 110. In more detail, the first blocking plate 122 having the multiple protrusions 122a and the panel 130 having the multiple notches 136 are interdigitated.

Accordingly, since the first blocking plate 122 and the panel 130 are interdigitated, the fragments of the optical disc will not easily shoot out through the clearance S between the first blocking plate 122 and the panel 130. Thus, the optical disc drive 100 may effectively prevent the fragments of the optical disc shooting out. In addition, multiple blocking ribs 124 (the blocking ribs 124 are, for example, located on the inner side of the first blocking plate 122, and the directions of the blocking ribs 124 are parallel to the path L) are disposed on the tray 120 in this embodiment, so as to effectively prevent the fragments of the optical disc shooting out of the optical disc drive.

Figure 3A:
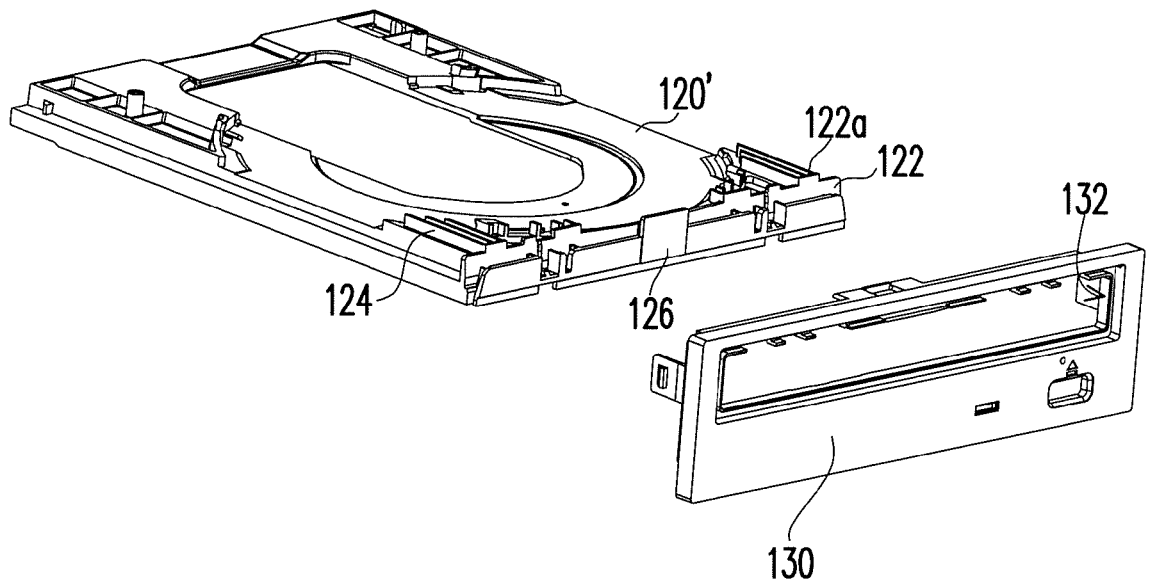
FIG. 3A is an exploded view of a tray and a panel according to another embodiment of the present invention.
Figure 3B:
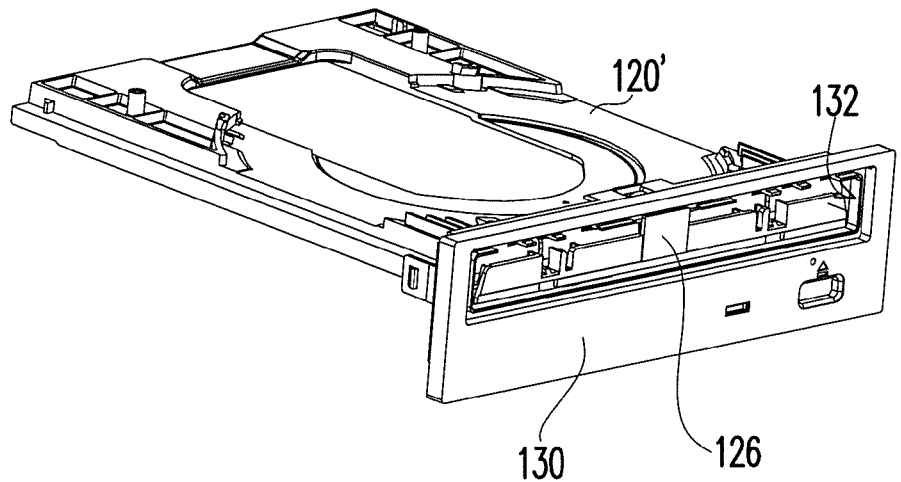
FIG. 3B is a combination view of the tray and the panel of FIG. 3A.

FIG. 3A is an exploded view of a tray and a panel according to another embodiment of the present invention. FIG. 3B is a combination view of the tray and the panel of FIG. 3A. Referring to FIGS. 3A and 3B, in addition to the first blocking plate 122 and the multiple blocking ribs 124, the tray 120' of another embodiment may also include a second blocking plate 126, so as to more effectively prevent fragments of the optical disc shooting out of the optical disc drive. In detail, in this embodiment, the second blocking plate 126 is also disposed on the front edge of the tray 120'. When the tray 120' is located in the housing of the optical disc drive, the second blocking plate 126 extends out of the second opening 132, and is suitable for shielding a part of the clearance S between the notches 136 and the first blocking plate 122 (as shown in FIG. 4A and FIG. 4B).

Figure 4A:
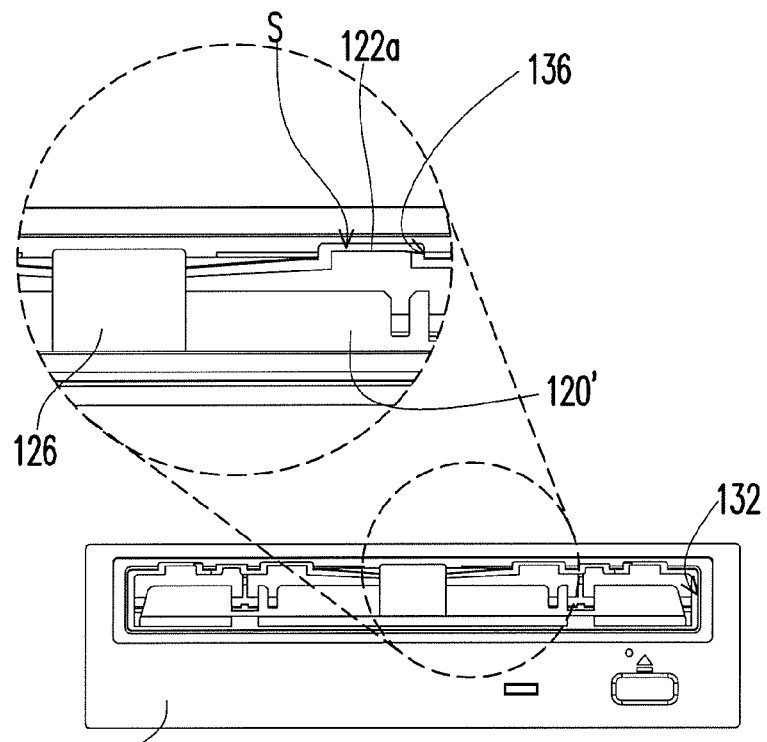
FIG. 4A is a front view of the tray and the panel of FIG. 3B.
Figure 4B:
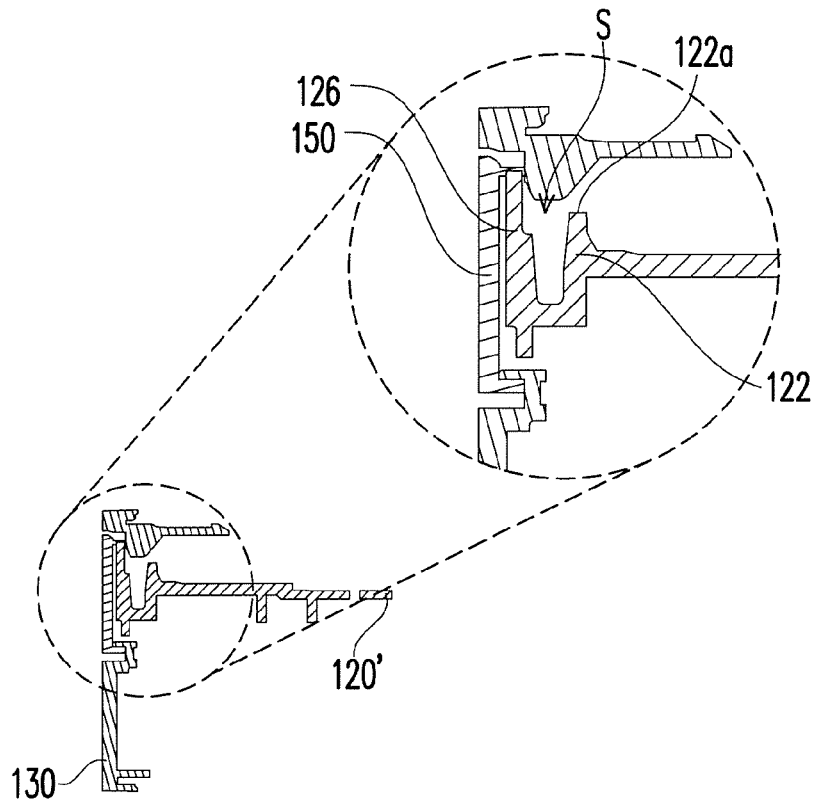
FIG. 4B is a cross-sectional view illustrating the tray and the panel of FIG. 3B suited with a lid.

FIG. 4A is a front view of the tray and the panel of FIG. 3B. FIG. 4B is a cross-sectional view illustrating the tray and the panel of FIG. 3B suited with a lid. In more detail, the second blocking plate 126 of this embodiment is suitable for shielding a part of the clearance S between the first blocking plate 122 and panel 130 (the first blocking plate 122 and the panel 130 are interdigitated). In this manner, even if the fragments with an extremely small size of the optical disc shoot out through the clearance S between the first blocking plate 122 and the panel 130 (the first blocking plate 122 and the panel 130 are interdigitated), the fragments of the optical disc will be blocked by the second blocking plate 126 and will not shoot out of the optical disc drive. In other words, the structural design of the tray 120' may more effectively prevent fragments of the optical disc shooting out of the optical disc drive.

Although the second blocking plate 126 of this embodiment does not completely shield the clearance S between the first blocking plate 122 and the panel 130, in other embodiments of the present invention, the second blocking plate may completely shield the clearance between the first blocking plate and the panel to prevent the fragments of the optical disc shooting out of the optical disc drive, or is staggered with the first blocking plate to prevent the fragments of the optical disc shooting out of the optical disc drive. That is to say, the way of disposing the first blocking plate interdigitated with the panel on the tray, or adding a second blocking plate on the tray for shielding the clearance between the first blocking plate and the panel does not depart from the spirit of the present invention, and the present invention will not be limited to this.

In view of the above, in the present invention, the first blocking plate having multiple protrusions on the upper edge thereof is disposed on the front edge of the tray, and multiple notches corresponding to the protrusions are disposed on the panel. Thus, the fragments of the optical disc will not easily shoot out of the optical disc drive through the clearance between the first blocking plate and panel (the first blocking plate 122 and the panel 130 are interdigitated). Furthermore, the tray may also further includes the second blocking plate to shield the clearance between the first blocking plate and panel (the first blocking plate 122 and the panel 130 are interdigitated), thereby further effectively preventing the fragments of the optical disc shooting out of the optical disc drive. In this manner, the optical disc drive of the present invention may effectively prevent the fragments of the optical disc to hurt the user.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical disc drive, comprising:
   a housing, having a first opening;
   a tray, disposed in the housing, and suitable for carrying an optical disc, wherein the tray comprises a first blocking plate disposed on one end of the tray, and multiple protrusions are disposed on an upper edge of the first blocking plate; and
   a panel, disposed at the first opening, and having a second opening, wherein the second opening has multiple notches corresponding to the protrusions, and the first blocking plate and the panel are interdigitated,
   wherein the tray is suitable for exiting out of the housing along a path through the second opening, and the protrusions are suitable for passing through the corresponding notches.

2. The optical disc drive according to claim 1, wherein when the tray is located in the housing, the first blocking plate is located on an inner or outer side of the second opening.

3. The optical disc drive according to claim 1, wherein the tray further includes a second blocking plate disposed on the front edge of the tray, and when the tray is located in the housing, the second blocking plate is located on an outer side of the second opening, and the second blocking plate is suitable for shielding a clearance between the notches and the first blocking plate.

4. The optical disc drive according to claim 1, wherein the tray further comprises multiple blocking ribs located on an inner side of the first blocking plate.

5. The optical disc drive according to claim 1, further comprising a lid disposed on a front edge of the tray, and suitable for covering the second opening.

6. The optical disc drive according to claim 1, further comprising a pickup module disposed in the housing, and suitable for reading a data in the optical disc.

7. The optical disc drive according to claim 1, wherein the pickup module includes a spin motor and an optical pickup head.

8. The optical disc drive according to claim 1, wherein the panel comprises multiple hooks through which the panel is fixed on the housing.

* * * * *